(12) United States Patent
Muccini et al.

(10) Patent No.: US 10,948,958 B2
(45) Date of Patent: Mar. 16, 2021

(54) SYSTEM AND METHOD OF UTILIZING POWER SUPPLY UNITS

(71) Applicant: Dell Products L.P., Round Rock, TX (US)

(72) Inventors: Mark A. Muccini, Georgetown, TX (US); Bhavesh Govindbhai Patel, Austin, TX (US); Lei Wang, Austin, TX (US); Kevin Mundt, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 16/152,607

(22) Filed: Oct. 5, 2018

(65) Prior Publication Data

US 2020/0110452 A1     Apr. 9, 2020

(51) Int. Cl.
*G06F 1/26* (2006.01)
(52) U.S. Cl.
CPC .................................. *G06F 1/263* (2013.01)
(58) Field of Classification Search
None
See application file for complete search history.

(56) References Cited

U.S. PATENT DOCUMENTS

| 7,127,623 | B2 * | 10/2006 | Potega | G06F 1/1632 |
| | | | | 713/300 |
| 2018/0183340 | A1 * | 6/2018 | Waters | H02M 1/36 |
| 2018/0316180 | A1 * | 11/2018 | Batenburg | H02H 3/20 |
| 2019/0033941 | A1 * | 1/2019 | Sultenfuss | G06F 1/266 |

* cited by examiner

*Primary Examiner* — Fahmida Rahman
(74) *Attorney, Agent, or Firm* — Baker Botts L.L.P.

(57) ABSTRACT

In one or more embodiments, one or more systems, methods, and/or processes may determine an engagement of a power supply unit with at least one of an information handling system (IHS) and a chassis configured to house multiple information handling systems (IHSs); may provide a power at a first voltage to the at least one of the IHS and the chassis; may determine if the at least one of the IHS and the chassis utilizes a second voltage; if the at least one of the IHS and the chassis utilizes the second voltage, may determine if the power supply unit is configured to provide the power at the second voltage; and if the power supply unit is configured to provide the power at the second voltage, may provide the power at the second voltage to the at least one of the IHS and the chassis.

7 Claims, 10 Drawing Sheets

SYSTEM AND METHOD OF UTILIZING POWER SUPPLY UNITS

BACKGROUND

Field of the Disclosure

This disclosure relates generally to information handling systems and more particularly to utilizing power supply units with information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, methods, and/or processes may determine an engagement of a power supply unit with at least one of an information handling system and a chassis configured to house multiple information handling systems; may provide a power at a first voltage to the at least one of the information handling system and the chassis; may determine if the at least one of the information handling system and the chassis utilizes a second voltage, greater than the first voltage; if the at least one of the information handling system and the chassis utilizes the second voltage: may determine if the power supply unit is configured to provide the power at the second voltage; if the power supply unit is configured to provide the power at the second voltage, may provide the power at the second voltage to the at least one of the information handling system and the chassis; and if the power supply unit is not configured to provide the power at the second voltage, may provide information indicating that the power supply unit is not configured to provide the power at the second voltage; and if the at least one of the information handling system and the chassis does not utilize the second voltage: may determine if the power supply unit is configured to provide the power at the first voltage; if the power supply unit is configure to provide the power at the first voltage, may provide the power at the first voltage to the at least one of the information handling system and the chassis; and if the power supply unit is not configured to provide the power at the first voltage, may provide information indicating that the power supply unit is not configured to provide the power at the first voltage.

In one or more embodiments, the second voltage may be associated with providing power to one or more graphics processing units. In one or more embodiments, providing the information indicating that the power supply unit is not configured to provide the power at the second voltage may include providing data to the at least one of the information handling system and the chassis that indicates that the power supply unit is not configured to provide the power at the second voltage. In one or more embodiments, providing the information indicating that the power supply unit is not configured to provide the power at the second voltage may include providing light emissions that indicate that the power supply unit is not configured to provide the power at the second voltage. In one or more embodiments, determining if the at least one of the information handling system and the chassis utilizes the second voltage may include receiving information from the at least one of the information handling system and the chassis that indicates if the at least one of the information handling system and the chassis utilizes the second voltage. In one or more embodiments, receiving the information from the at least one of the information handling system and the chassis may include receiving the information via at least one of a bus and a connector. In one or more embodiments, determining if the at least one of the information handling system and the chassis utilizes the second voltage may include determining a voltage measurement across a resistor. For example, determining if the at least one of the information handling system and the chassis utilizes the second voltage may include determining if the voltage measurement matches a third voltage. In one or more embodiments, determining the voltage measurement across the resistor may include receiving, from an analog to digital converter, digital data that indicates the voltage measurement across the resistor. In one or more embodiments, one or more systems, methods, and/or processes may further provide current to the resistor. For example, the at least one of the information handling system and the chassis may include the resistor.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
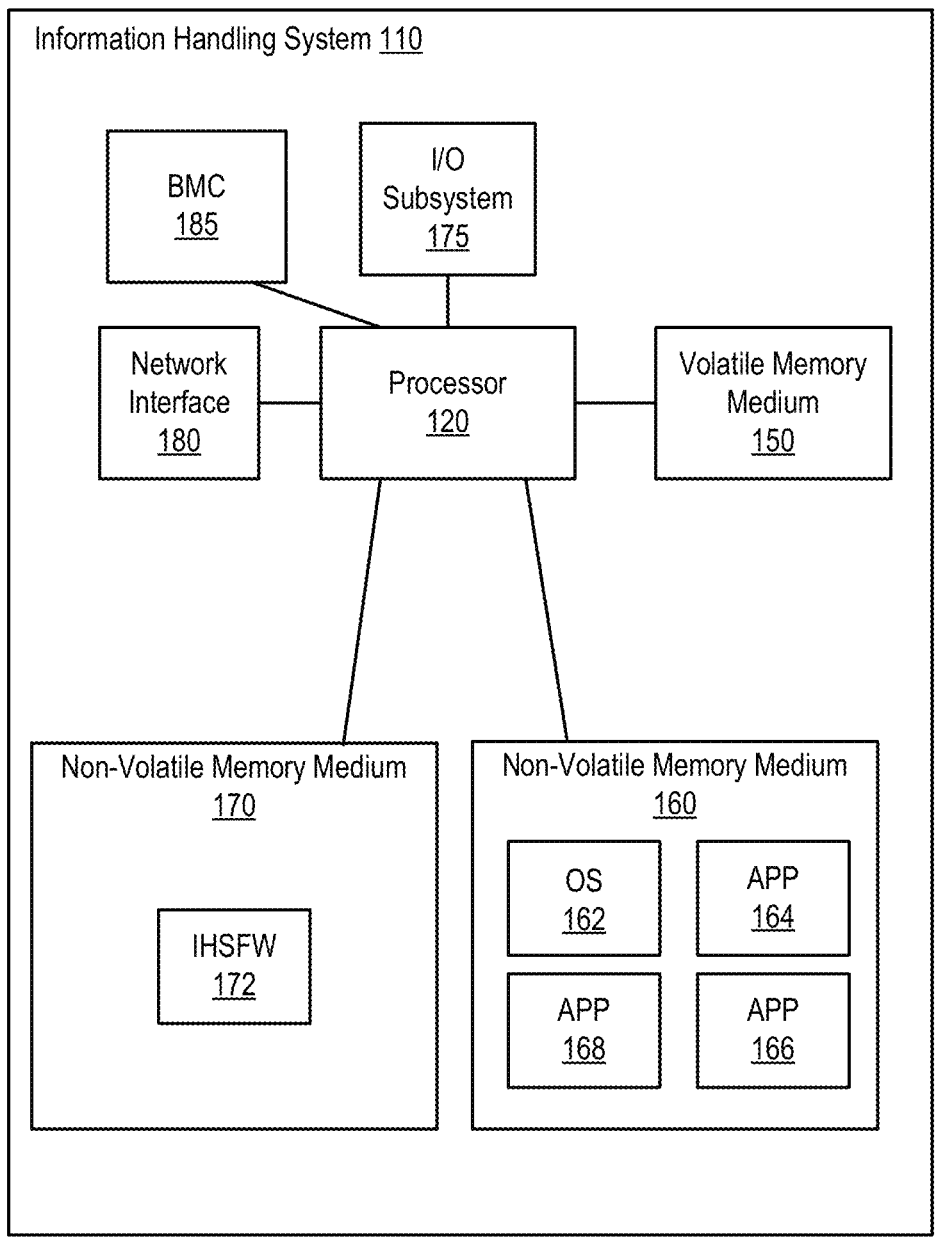
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, multiple components of an information handling system may utilized different voltages. In one example, a first component of the information handling system may utilize twelve volts (12V). In another example, a second component of the information handling system may utilize forty-eight volts (48V). For instance, graphics processing unit (GPU) producers may increase voltages utilized by graphics processing units (GPUs) (e.g., increased to forty-eight volts (48V) or higher). In one or more embodiments, GPU producers may utilize an increased voltage to provide power to increasing numbers of GPU in products that the GPU producers may produce. For example, increasing numbers of GPU cores may assuage or meet growing demands for increased computing power. For instance, demands for increased computing power may include one or more of artificial intelligence, public ledger computations (e.g., blockchain, crypto currency mining, etc.), computer generated imagery, computer vision, and machine learning, among others.

In one or more embodiments, one or more of an information handling system and a chassis configured to house multiple information handling systems may include one or more power supply units (PSUs). In one example, a first power supply unit (PSU) may provide power associated with a first voltage. For instance, the first PSU may provide current at the first voltage. In another example, a second PSU may provide power associated with a second voltage, greater than the first voltage. For instance, the second PSU may provide current at the second voltage. In one or more embodiments, the first PSU and the second PSU may share a form factor. For example, the first PSU and the second PSU may be utilized with the one or more of the information handling system and the chassis. For instance, the first PSU and the second PSU may be utilized with the one or more of the information handling system and the chassis regardless of configuration and/or voltage handling capability of the one or more of the information handling system and the chassis. In one or more embodiments, if the one or more of the information handling system and the chassis is not configured to handle the second voltage, the one or more of the information handling system and the chassis may be damaged if the second PSU is utilized with the one or more of the information handling system and the chassis. In one or more embodiments, if the one or more of the information handling system and the chassis is configured to handle the second voltage, the one or more of the information handling system and the chassis may not operate or may not operate properly if the first PSU is utilized with the one or more of the information handling system and the chassis.

In one or more embodiments, if the first PSU and the second PSU share a form factor, manufacturing time and/or energy in manufacturing may be reduced. For example, reducing energy in manufacturing may reduce emissions to the environment. For instance, it may be advantageous to reduce emissions to the environment. In one or more embodiments, the form factor may include a common electrical coupling. In one example, a connector may include the common electrical coupling. In another example, the common electrical coupling may include a connector. In one or more embodiments, if the first PSU and the second PSU share a common electrical coupling, manufacturing time and/or energy in manufacturing may be reduced. For example, reducing energy in manufacturing may reduce emissions to the environment. For instance, it may be advantageous to reduce emissions to the environment.

In one or more embodiments, determining the first PSU from the second PSU may eliminate damage to the one or more of the information handling system and the chassis if a mismatched PSU is utilized with the one or more of the information handling system and the chassis. In one or more embodiments, determining the first PSU from the second PSU may permit the one or more of the information handling system and the chassis to function.

In one or more embodiments, the first PSU may provide power at the first voltage to the one or more of the information handling system and the chassis. For example, if the one or more of the information handling system and the chassis are configured for the second voltage, the one or more of the information handling system and the chassis may not be damaged. For instance, even if the one or more of the information handling system and the chassis may not be damaged, the one or more of the information handling system and the chassis may not function properly, or even function at all, if the one or more of the information handling system and the chassis do not receive power at the second voltage. In one or more embodiments, the first PSU and the one or more of the information handling system and the chassis may exchange information. In one example, the first PSU may provide information indicating that the first PSU provides power at the first voltage. In another example, the one or more of the information handling system and the chassis may provide information indicating that the one or more of the information handling system and the chassis may require power at the second voltage.

In one or more embodiments, the second PSU may provide power at the second voltage to the one or more of the information handling system and the chassis. For example, if the one or more of the information handling system and the chassis are configured for the first voltage, the one or more of the information handling system and the chassis may be damaged. In one or more embodiments, the second PSU may provide power at the first voltage to the one or more of the information handling system and the chassis. In one example, the second PSU providing at the first voltage to the one or more of the information handling system and the chassis may not damage the one or more of the information handling system and the chassis. In another example, the second PSU providing at the first voltage to the one or more of the information handling system and the chassis may permit one or more determinations to occur and/or may permit information to be exchanged. In one or more embodiments, the second PSU and the one or more of the information handling system and the chassis may exchange information. In one example, the second PSU may provide information indicating that the second PSU provides power at the second voltage. In another example, the one or more of the information handling system and the chassis may provide information indicating that the one or more of the information handling system and the chassis may require power at the first voltage.

In one or more embodiments, the one or more of the information handling system and the chassis may include a resistor. For example, a PSU (e.g., the first PSU or the second PSU) may apply a current to the resistor, and the PSU may determine a voltage measurement across the resistor. In one instance, if the voltage measurement across the resistor matches a third voltage, the PSU may determine that the one or more of the information handling system and the chassis may utilize the first voltage. In another instance, if the voltage measurement across the resistor matches a fourth voltage, the PSU may determine that the one or more of the information handling system and the chassis may utilize the second voltage. In one or more embodiments, if the PSU is not appropriately matched with the one or more of the information handling system and the chassis, the PSU may provide information that indicates that it is not appropriately matched with the one or more of the information handling system and the chassis. In one instance, the PSU may provide the information to the one or more of the information handling system and the chassis. In another instance, the PSU may provide the information to a user via one or more sounds and/or one or more light emissions. In one or more embodiments, the PSU may include one or more light emitting diodes (LEDs). For example, the one or more LEDs may provide the information to the user. In one instance, at least one of the one or more LEDs may blink, which may indicate that the PSU is not appropriately matched with the one or more of the information handling system and the chassis. In another instance, at least one of the one or more LEDs may be steadily illuminated, which may indicate that the PSU is not appropriately matched with the one or more of the information handling system and the chassis.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, and a baseboard management controller (BMC) 185. As illustrated, volatile memory medium 150, non-volatile memory media 160 and 170, I/O subsystem 175, network interface 180, and BMC 185 may be communicatively coupled to processor 120.

In one or more embodiments, one or more of volatile memory medium 150, non-volatile memory media 160 and 170, I/O subsystem 175, network interface 180, and BMC 185 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing at least a portion of one or more systems, one or more flowcharts, one or more methods, and/or one or more processes described herein. In another example, processor 120 may execute processor instructions via network interface 180 in implementing at least a portion of one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, BMC 185 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 185 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 185 may be configured, coded, and/or encoded with instructions in accordance with one or more of systems, flowcharts, methods, and/or processes described herein. In one or more embodiments, BMC 185 may be configured to implement at least a portion of one or more systems, one or more flowcharts, one or more methods, and/or one or more processes described herein. In one or more embodiments, BMC 185 may be or include one or more of a field programmable gate array (FPGA) and an ASIC, among others, configured, coded, and/or encoded with instructions in accordance with one or more of systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated).

Figure 2A:
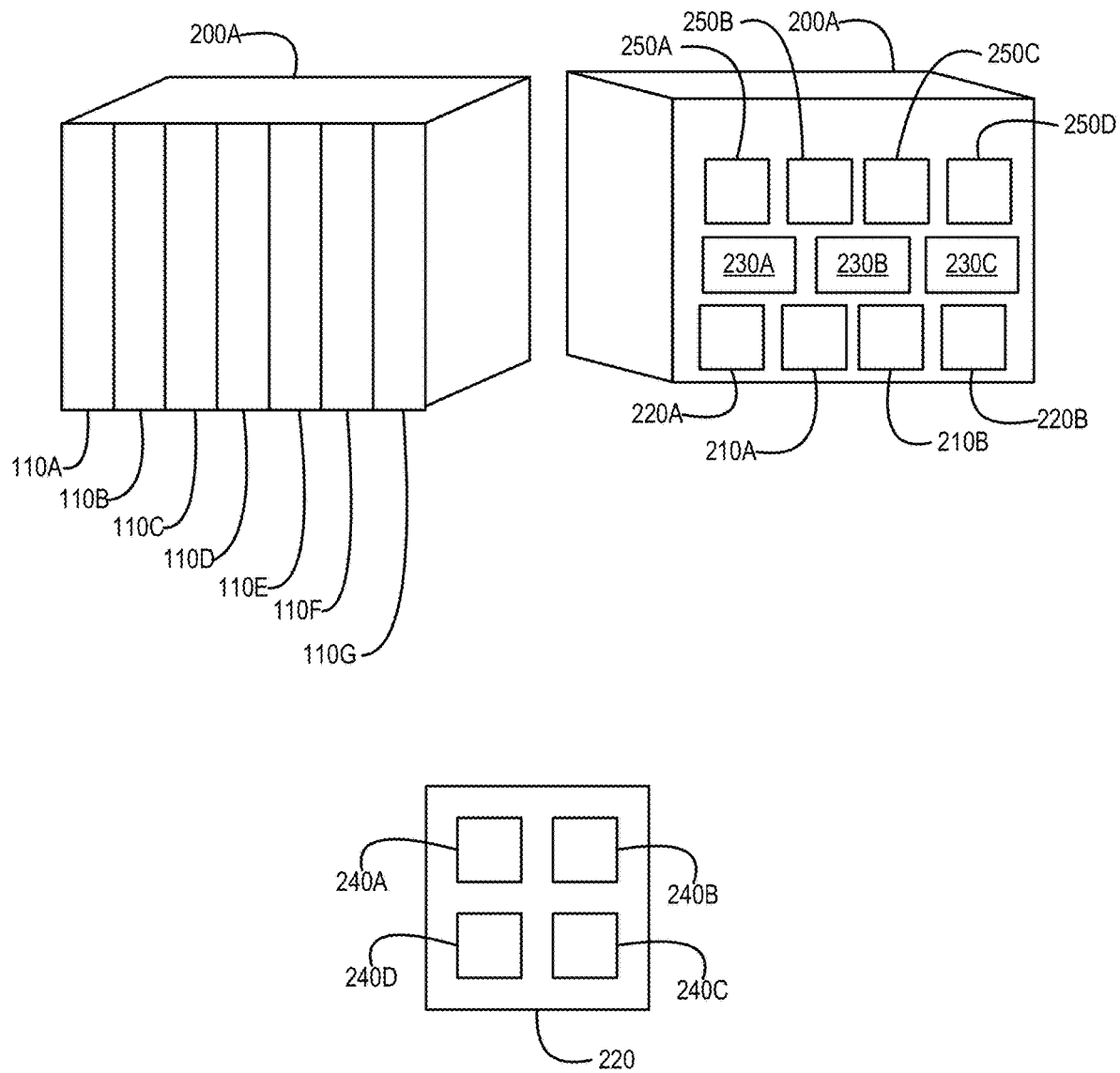
FIGS. 2A and 2B illustrate examples of information handling system chassis, according to one or more embodiments.
Figure 2B:
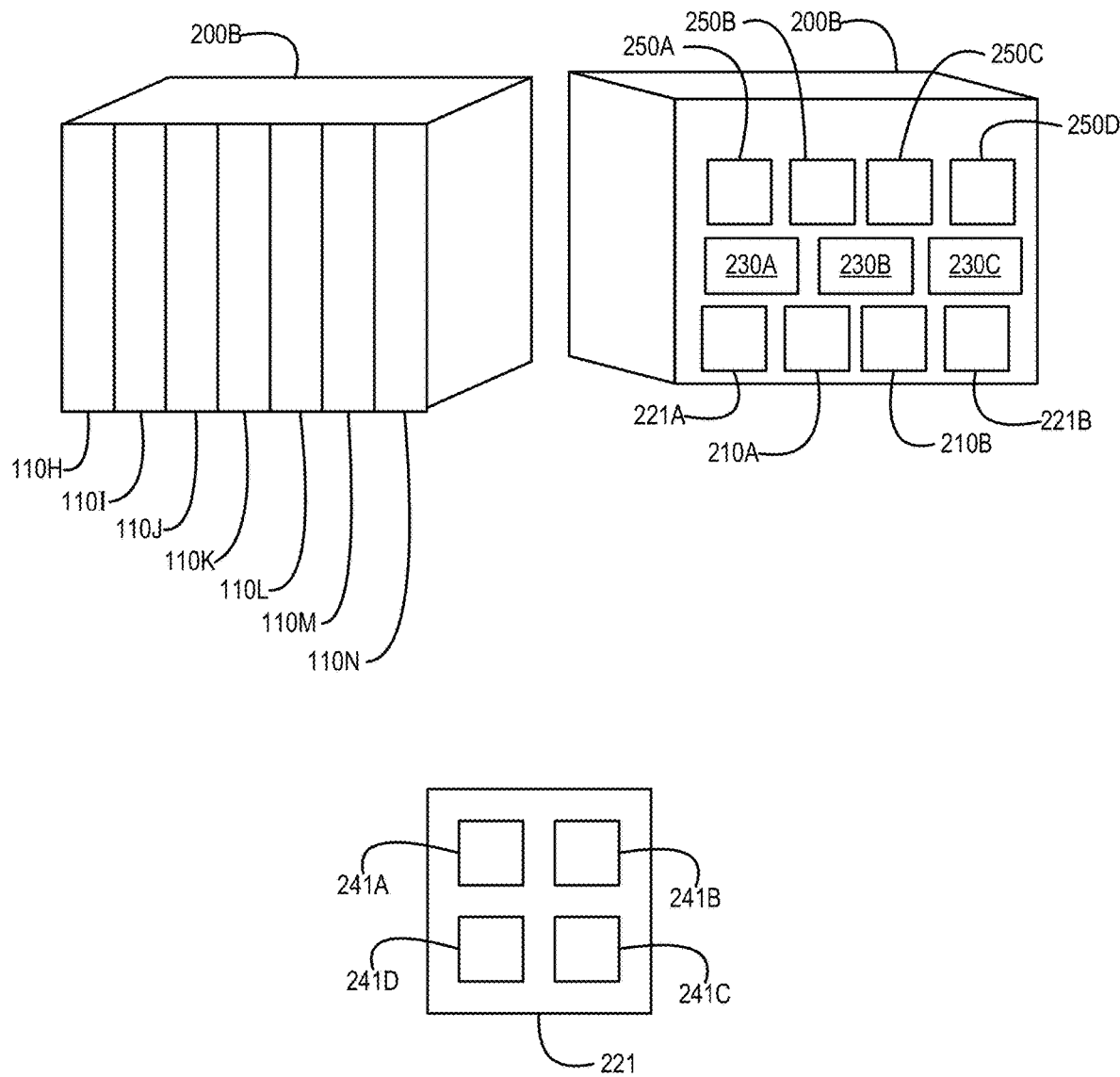

Turning now to FIGS. 2A and 2B, examples of information handling system chassis are illustrated, according to one or more embodiments. As shown in FIG. 2A, an information handling system chassis 200A may include and/or may be configured to include multiple information handling systems (IHSs). For example, chassis 200A may and/or may be configured to include IHSs 110A-110G. For instance, one or more of IHSs 110A-110G may be removable. In one or more embodiments, a first IHS 110 may be swapped for a second IHS 110, different from the first IHS 110.

As illustrated in FIG. 2B, an information handling system chassis 200B may include and/or may be configured to include multiple IHSs. For example, chassis 200B may and/or may be configured to include IHSs 110H-110N. For instance, one or more of IHSs 110H-110N may be removable. In one or more embodiments, a first IHS 110 may be swapped for a second IHS 110, different from the first IHS 110.

In one or more embodiments, chassis 200 may include one or more enclosure controllers. As illustrated, chassis 200 may include enclosure controllers (ECs) 210A and 210B. In one or more embodiments, an enclosure controller (EC) 210 may be or include a chassis management controller (CMC). For example, an EC 210 may manage one or more components of chassis 200. In one or more embodiments, chassis 200 may include one or more power supply nodes (PSNs).

As shown in FIG. 2A, chassis 200A may include PSNs 220A and 220B. In one or more embodiments, a power supply node (PSN) 220 may include one or more PSUs 240. For example, a PSN 220 may include multiple power PSUs 240A-240D. For instance, if one of the multiple PSUs is associated with an issue, PSN 220 may continue to provide power to chassis 200A via one or more other PSUs. In one or more embodiments, a PSU 240 may provide power at a first voltage. For example, the first voltage may be twelve volts (12V). In one or more embodiments, one or more of PSNs 220A and 220B may be removable. For example, a first PSN 220 may be swapped for a second PSN 220, different from the first PSN 220. In one instance, the first PSN 220 may be swapped for the second PSN 220 without ceasing operations of one or more of IHSs 110A-110G. In one instance, the first PSN 220 may be swapped for the second PSN 220 without throttling one or more of IHSs 110A-110G. In one or more embodiments, one or more of ECs 210A and 210B may be removable. For example, a first EC 210 may be swapped for a second EC 210, different from the first EC 210. For instance, the first EC 210 may be swapped for the second EC 210 without ceasing operations of one or more of IHSs 110A-110G.

As illustrated in FIG. 2B, chassis 200B may include PSNs 221A and 221B. In one or more embodiments, a PSN 221 may include one or more PSUs 241. For example, a PSN 221 may include multiple power PSUs 241A-241D. For instance, if one of the multiple PSUs is associated with an issue, PSN 221 may continue to provide power to chassis 200B via one or more other PSUs. In one or more embodiments, a PSU 241 may provide power at a second voltage. For example, the second voltage may be forty-eight volts (48V). In one or more embodiments, one or more of PSNs 221A and 221B may be removable. For example, a first PSN 221 may be swapped for a second PSN 221, different from the first PSN 221. In one instance, the first PSN 221 may be swapped for the second PSN 221 without ceasing operations of one or more of IHSs 110H-110N. In one instance, the first PSN 221 may be swapped for the second PSN 221 without throttling one or more of IHSs 110H-110N. In one or more embodiments, one or more of ECs 210A and 210B may be removable. For example, a first EC 210 may be swapped for a second EC 210, different from the first EC 210. For instance, the first EC 210 may be swapped for the second EC 210 without ceasing operations of one or more of IHSs 110H-110N.

In one or more embodiments, chassis 200 may include one or more fans. For example, the one or more fans may provide airflow through various one or more portions of chassis 200. For instance, the airflow through various one or more portions of chassis 200 may remove heat from one or more portions of chassis 200 and/or one or more portions of one or more IHSs 110. As illustrated in FIGS. 2A and 2B, chassis 200 may include fans 230A-230C. In one or more embodiments, an EC 210 may monitor one or more fans 230, one or more temperatures of one or more portions of chassis 200, one or more PSUs 240, and/or one or more PSNs 220, among others. In one or more embodiments, an EC 210 may monitor one or more fans 230, one or more temperatures of one or more portions of chassis 200, one or more PSUs 241, and/or one or more PSNs 221, among others. In one or more embodiments, EC 210 may control one or more portions and/or one or more components of chassis 200.

In one or more embodiments, EC 210 may include one or more structures and/or one or more functionalities as those described with reference to IHS 110. In one or more embodiments, EC 210 may include one or more structures and/or one or more functionalities as those described with reference to BMC 185. In one or more embodiments, EC 210 may be configured, coded, and/or encoded with instructions in accordance with at least a portion of one or more of systems, flowcharts, methods, and/or processes described herein.

In one or more embodiments, chassis 200 may include one or more non-volatile memory media. For example, chassis 200 may include non-volatile memory media 250A-250D. In one or more embodiments, a non-volatile memory medium 250 may include one or more structures and/or one or more functionalities as those described with reference to non-volatile memory medium 160. In one example, one or more of non-volatile memory media 250A-250D may provide storage for one or more of IHSs 110A-110G. In another example, one or more of non-volatile memory media 250A-250D may provide storage for one or more of IHSs 110H-110N.

Figure 2C:
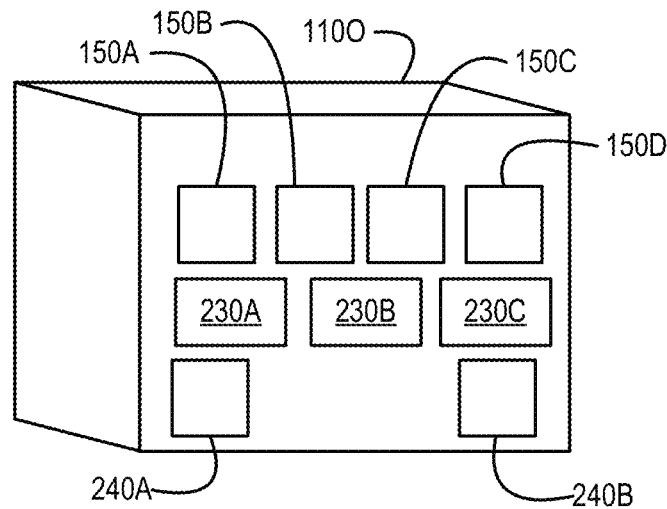
FIG. 2C illustrates other examples of information handling systems, according to one or more embodiments.
Figure 2C:
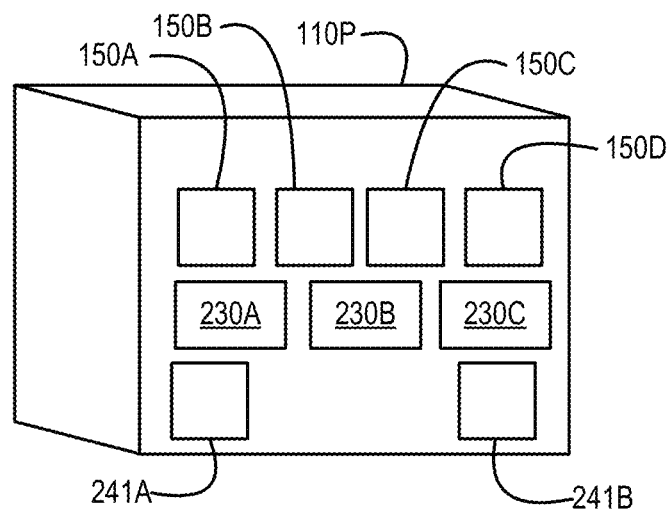

Turning now to FIG. 2C, other examples of information handling systems are illustrated, according to one or more embodiments. As shown, an IHS 1100 may include PSUs 240A and 240B. In one or more embodiments, a PSU 240 may provide power at a first voltage. For example, the first voltage may be twelve volts (12V). As illustrated, IHS 1100 may include fans 230A-230C. As shown, IHS 1100 may include non-volatile memory media 150A-150D. As illustrated, an IHS 110P may include PSUs 241A and 241B. In one or more embodiments, a PSU 241 may provide power at a second voltage. For example, the second voltage may be forty-eight volts (48V). As shown, IHS 110P may include fans 230A-230C. As illustrated, IHS 110P may include non-volatile memory media 150A-150D.

Figure 3:
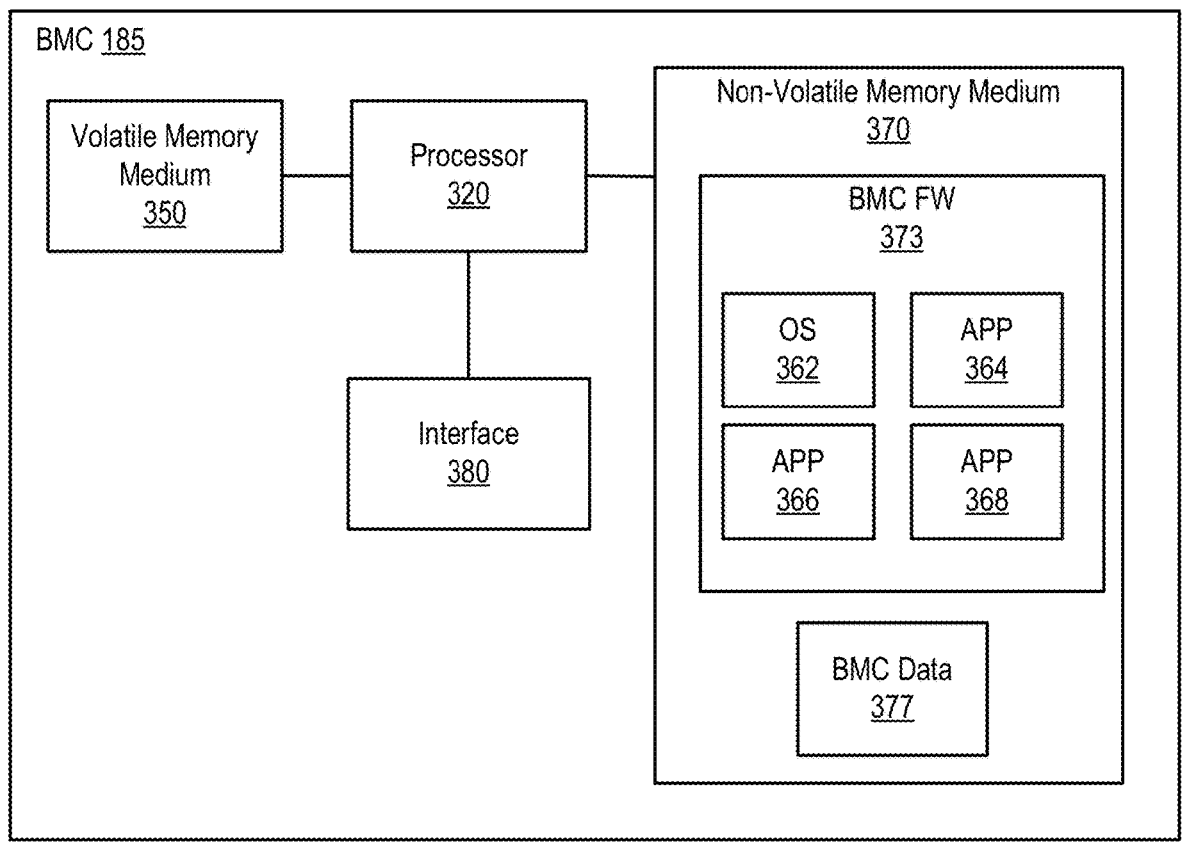
FIG. 3 illustrates an example of a baseboard management controller, according to one or more embodiments.

Turning now to FIG. 3, an example of a baseboard management controller is illustrated, according to one or more embodiments. As shown, BMC 185 may include a processor 320, a volatile memory medium 350, a non-volatile memory medium 370, and an interface 380. As illustrated, non-volatile memory medium 370 may include a BMC firmware (FW) 374, which may include an OS 362 and APPs 364-368, and may include BMC data 377. In one example, OS 362 may be or include a real-time operating system (RTOS). In another example, OS 362 may be or include an Unix-like operating system.

In one or more embodiments, interface 380 may include circuitry that enables communicatively coupling to one or more devices. In one example, interface 380 may include circuitry that enables communicatively coupling to one or more buses. For instance, the one or more buses may include one or more buses described herein, among others. In a second example, interface 380 may include circuitry that enables one or more interrupt signals to be received. In one instance, interface 380 may include general purpose input/output (GPIO) circuitry, and the GPIO circuitry may enable one or more interrupt signals to be received and/or provided via at least one interrupt line. In another instance, interface 380 may include GPIO circuitry that may enable BMC 185 to provide and/or receive signals associated with other circuitry (e.g., diagnostic circuitry, etc.). In a third example, interface 380 may include circuitry that enables communicatively coupling to one or more networks. In one instance, interface 380 may include circuitry that enables communicatively coupling to network interface 180. In another example, interface 380 may include a network interface. In another example, interface 380 may include circuitry that enables BMC 185 to communicate with one or more of PSU 240 and 241, among others.

In one or more embodiments, one or more of OS 362 and APPs 364-368 may include processor instructions executable by processor 320. In one example, processor 320 may execute processor instructions of one or more of OS 362 and APPs 364-368 via non-volatile memory medium 370. In another example, one or more portions of the processor instructions of the one or more of OS 362 and APPs 364-368 may be transferred to volatile memory medium 350, and processor 320 may execute the one or more portions of the processor instructions of the one or more of OS 362 and APPs 364-368 via volatile memory medium 350. In one or more embodiments, processor 320 may execute instructions in accordance with one or more of systems, flowcharts, methods, and/or processes described herein. For example, non-volatile memory medium 370 and/or volatile memory medium 360 may store instructions that may be executable in accordance with one or more of systems, flowcharts, methods, and/or processes described herein. In one or more embodiments, processor 320 may execute instructions in accordance with at least a portion of one or more of systems, flowcharts, methods, and/or processes described herein. For example, non-volatile memory medium 370 and/or volatile memory medium 360 may store instructions that may be executable in accordance with at least a portion of one or more of systems, flowcharts, methods, and/or processes described herein. In one or more embodiments, processor 320 may utilize BMC data 377. In one example, processor 320 may utilize BMC data 377 via non-volatile memory medium 370. In another example, one or more portions of BMC data 377 may be transferred to volatile memory medium 350, and processor 320 may utilize BMC data 377 via volatile memory medium 350.

Figure 4A:
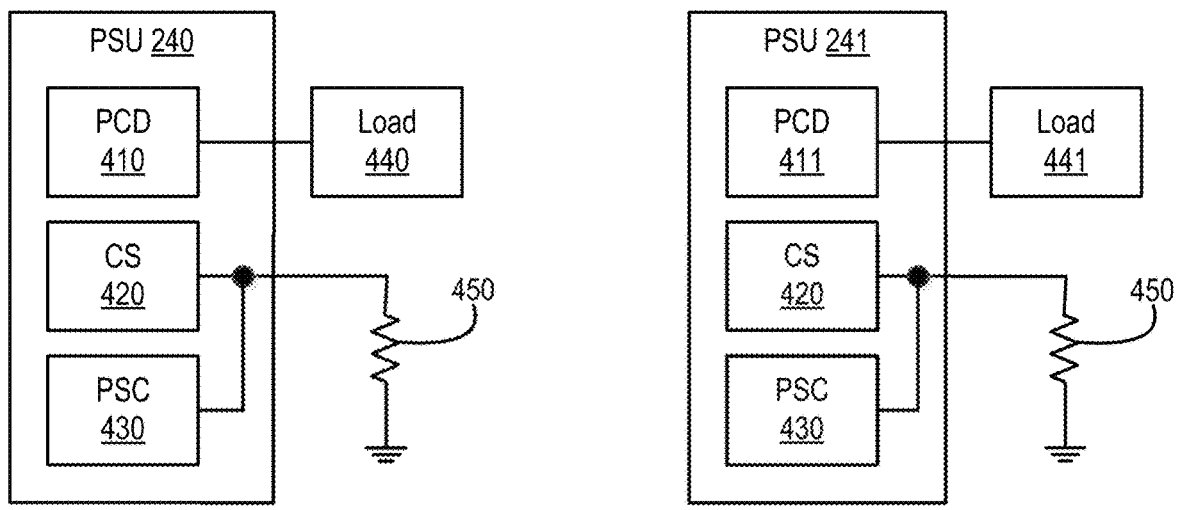
FIG. 4A illustrates examples of power supply units, according to one or more embodiments.

Turning now to FIG. 4A, examples of power supply units are illustrated, according to one or more embodiments. As shown, PSU 240 may include a power controller device (PCD) 410. As illustrated, PCD 410 may be coupled to a load 440. In one or more embodiments, PCD 410 may provide power to load 440. For example, PCD 410 may provide power to a load 440 at a first voltage. For instance, the first voltage may be twelve volts (12V). As illustrated, PSU 241 may include a PCD 411. As shown, PCD 411 may be coupled to a load 441. In one or more embodiments, PCD 411 may provide power to load 441. For example, PCD 411 may provide power to a load 441 at a second voltage. For instance, the second voltage may be forty-eight volts (48V).

As illustrated, each of PSUs 240 and 241 may include a current source (CS) 420. As shown, CS 420 may be coupled to a resistor 450. In one or more embodiments, CS 420 may provide current to a resistor 450. As illustrated, each of PSUs 240 and 241 may include a power supply controller (PSC) 430. As shown, PSC 430 may be coupled to resistor 450. In one or more embodiments, PSC 430 may measure a voltage across resistor 450. For example, PSC 430 may include analog-to-digital converter (ADC) circuitry. For instance, the ADC circuitry may convert an analog voltage value to digital data (e.g., a digital number). In one or more embodiments, PSC 430 may include one or more functionalities and/or one or more structures as those with reference to BMC 185.

Figure 4B:
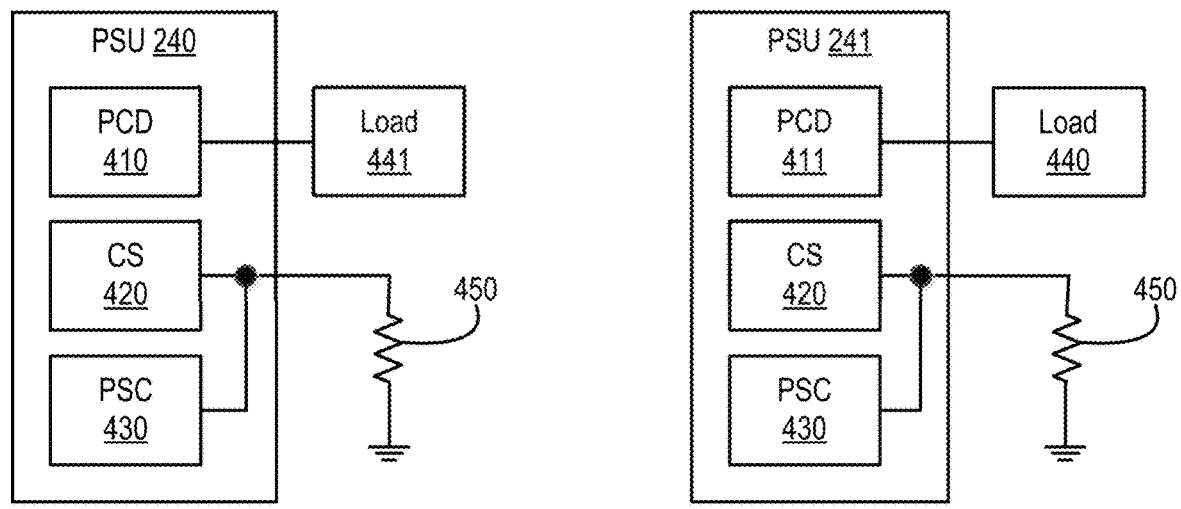
FIG. 4B illustrates additional examples of power supply units, according to one or more embodiments.

Turning now to FIG. 4B, additional examples of power supply units are illustrated, according to one or more embodiments. As shown, PCD 410 may be coupled to load 441. For example, PCD 410 may provide power at the first voltage, while load 441 may utilize power at the second voltage. In one or more embodiments, PSC 430 may control PCD 410. For example, PSC 430 may determine that a load coupled to PCD 410 utilizes power at the second voltage and may instruct PCD 410 to shut down.

As illustrated, PCD 411 may be coupled to load 440. For example, PCD 411 may provide power at the second voltage, while load 440 may utilize power at the first voltage. In one or more embodiments, PCD 411 may initially provide power at the first voltage until it is determined that a load coupled to PCD 411 utilizes power at the second voltage. In one or more embodiments, PSC 430 may control PCD 411. For example, PSC 430 may instruct PCD 411 to provide the first voltage to a load coupled to PCD 411. In one instance, PSC 430 may determine that a load coupled to PCD 411 utilizes power at the second voltage and may instruct PCD 411 to provide power at the second voltage. In another instance, PSC 430 may determine that a load coupled to PCD 411 utilizes power at the first voltage and may instruct PCD 411 to shut down. In one or more embodiments, while PCD 411 may initially provide power at the first voltage to a load that utilizes power at the first voltage, PCD 411 may not be configured to continually and/or sustainably provide power at the first voltage to the load that utilizes power at the first voltage. For example, PSC 430 may instruct PCD 411 to shut down, after determining that the load that utilizes power at the first voltage, as PCD 411 may not be configured to continually and/or sustainably provide power at the first voltage to the load that utilizes power at the first voltage. For instance, PCD 411 may be configured to optimally provide power at the second voltage.

Figure 4C:
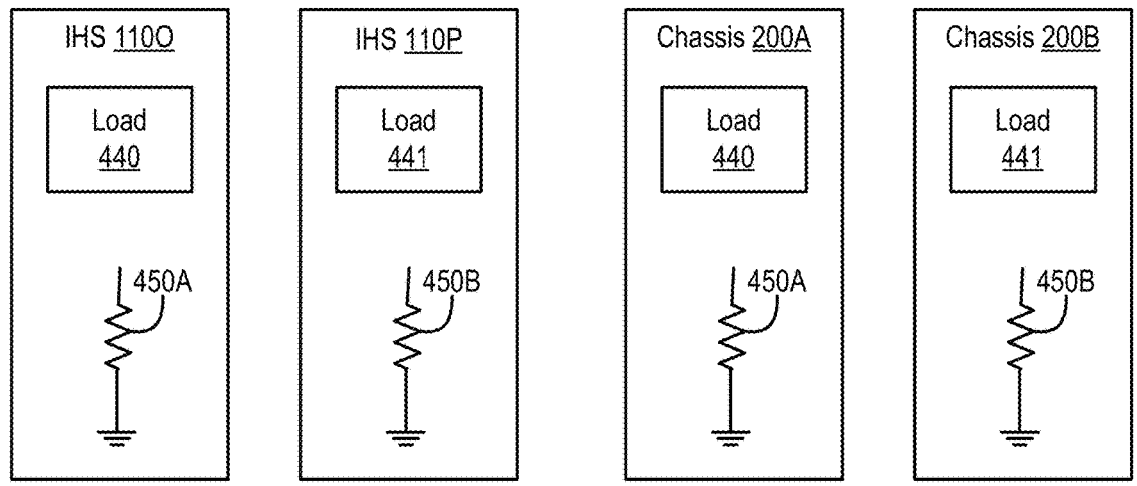
FIG. 4C illustrate examples of information handling systems and chassis, according to one or more embodiments.

Turning now to FIG. 4C, examples of information handling systems and chassis are illustrated, according to one or more embodiments. As shown, IHS 1100 may include load 440 and a resistor 450A. For example, resistor 450A may be associated with a first resistance. As illustrated, IHS 110P may include load 441 and a resistor 450B. For example, resistor 450B may be associated with a second resistance, different from the first resistance. As shown, chassis 200A may include load 440 and resistor 450A. As illustrated, chassis 200B may include load 441 and resistor 450B.

In one or more embodiments, CS 420 may provide current to resistor 450A. For example, PSC 430 may determine a voltage associated with resistor 450A with the current provided by CS 420. For instance, PSC 430 may determine a third voltage associated with resistor 450A with the current provided by CS 420. In one or more embodiments, the third voltage may indicate that load 440 utilizes power at the first voltage. For example, the first voltage may be twelve volts (12V).

In one or more embodiments, CS 420 may provide current to resistor 450B. For example, PSC 430 may determine a voltage associated with resistor 450B with the current provided by CS 420. For instance, PSC 430 may determine a fourth voltage associated with resistor 450B with the current provided by CS 420. In one or more embodiments, the fourth voltage may indicate that load 441 utilizes power at the second voltage. For example, the second voltage may be forty-eight volts (48V). In one or more embodiments, the resistance associated with resistor 450A may be different from the resistance associated with 450B. In one or more embodiments, CS 420 of PSU 240 and CS 420 of PSU 241 may provide the same amount of current.

Figure 4D:
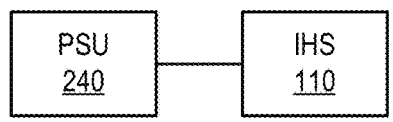
FIG. 4D illustrates an example of a power supply unit communicatively coupled to an information handling system, according to one or more embodiments.

Turning now to FIG. 4D, an example of a power supply unit communicatively coupled to an information handling system is illustrated, according to one or more embodiments. As shown, PSU 240 may be communicatively coupled to IHS 110. In one or more embodiments, PSU 240 and IHS 110 may communicate. For example, PSU 240 may receive information from IHS 110. In one instance, PSU 240 may determine, based at least on the information received from IHS 110, if IHS 110 utilizes power at the first voltage. In another instance, PSU 240 may determine, based at least on the information received from IHS 110, if IHS 110 utilizes power at the second voltage.

Figure 4E:
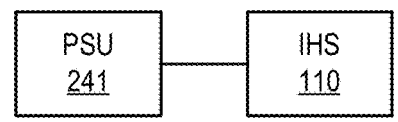
FIG. 4E illustrates another example of another power supply unit communicatively coupled to an information handling system, according to one or more embodiments.

Turning now to FIG. 4E, another example of another power supply unit communicatively coupled to an information handling system is illustrated, according to one or more embodiments. As shown, PSU 241 may be communicatively coupled to IHS 110. In one or more embodiments, PSU 241 and IHS 110 may communicate. For example, PSU 241 may receive information from IHS 110. In one instance, PSU 241 may determine, based at least on the information received from IHS 110, if IHS 110 utilizes power at the first voltage. In another instance, PSU 241 may determine, based at least on the information received from IHS 110, if IHS 110 utilizes power at the second voltage.

Figure 4F:
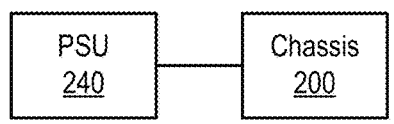
FIG. 4F illustrates an example of a power supply unit communicatively coupled to a chassis, according to one or more embodiments.

Turning now to FIG. 4F, an example of a power supply unit communicatively coupled to a chassis is illustrated, according to one or more embodiments. As shown, PSU 240 may be communicatively coupled to chassis 200. In one or more embodiments, PSU 240 and chassis 200 may communicate. For example, PSU 240 may receive information from chassis 200. In one instance, PSU 240 may determine, based at least on the information received from chassis 200, if chassis 200 utilizes power at the first voltage. In another instance, PSU 240 may determine, based at least on the information received from chassis 200, if chassis 200 utilizes power at the second voltage.

Figure 4G:
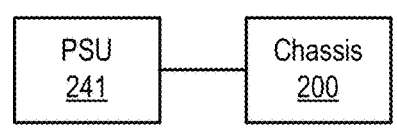
FIG. 4G illustrates another example of another power supply unit communicatively coupled to a chassis, according to one or more embodiments.

Turning now to FIG. 4G, another example of another power supply unit communicatively coupled to a chassis is illustrated, according to one or more embodiments. As shown, PSU 241 may be communicatively coupled to chassis 200. In one or more embodiments, PSU 241 and chassis 200 may communicate. For example, PSU 241 may receive information from chassis 200. In one instance, PSU 241 may determine, based at least on the information received from chassis 200, if chassis 200 utilizes power at the first voltage. In another instance, PSU 241 may determine, based at least on the information received from chassis 200, if chassis 200 utilizes power at the second voltage.

Figure 5:
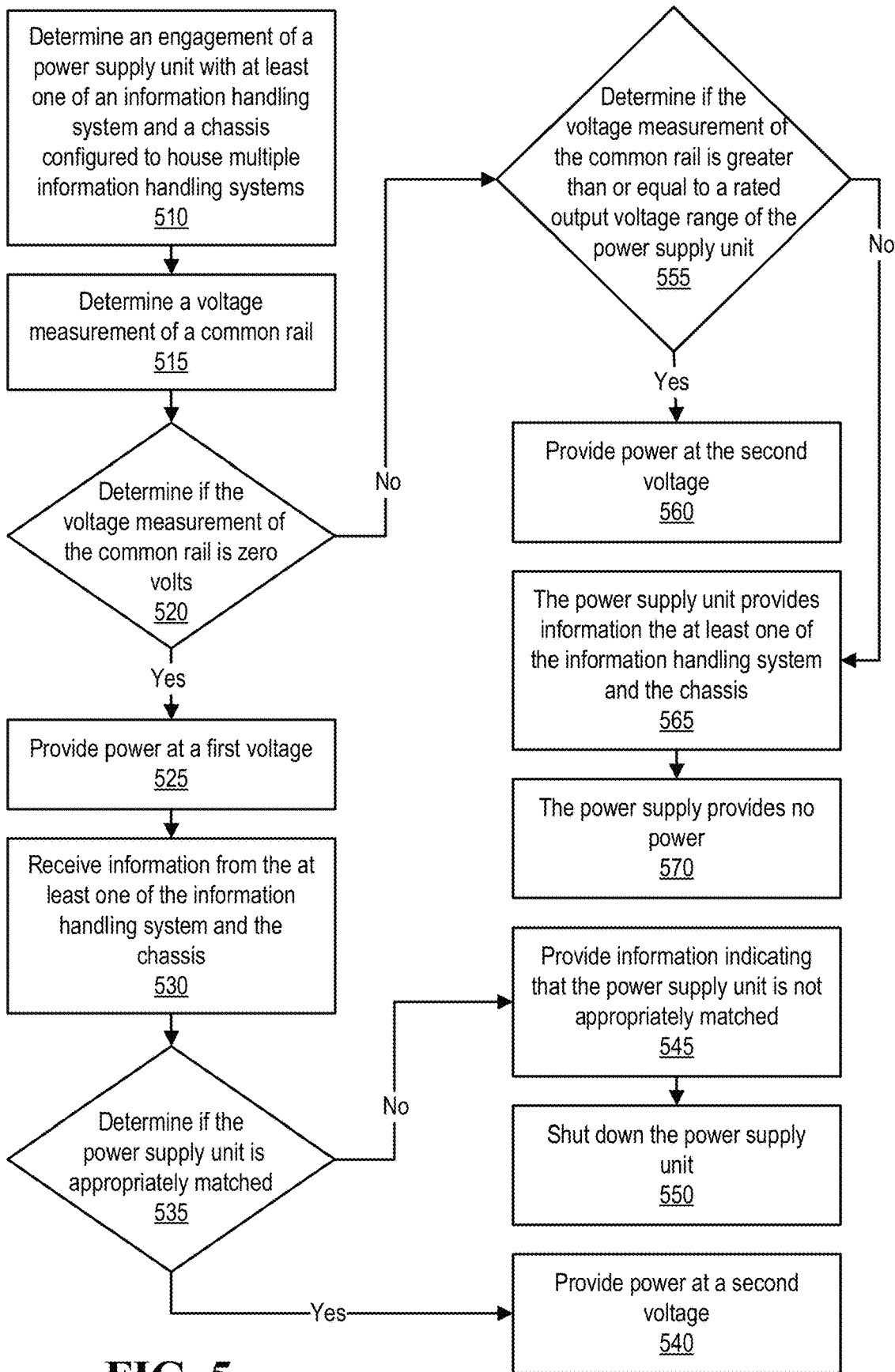
FIG. 5 illustrates an example of a method of utilizing a power supply unit, according to one or more embodiments.

Turning now to FIG. 5, an example of a method of utilizing a power supply unit is illustrated, according to one or more embodiments. At 510, an engagement of a power supply unit with at least one of an information handling system and a chassis, configured to house multiple information handling systems, may be determined. For example, an engagement of PSU 241 with at least one of IHS 110 and chassis 200 may be determined. For instance, PSU 241 may determine the engagement of PSU 241 with the at least one of IHS 110 and chassis 200.

At 515, a voltage measurement of a common rail may be determined. For example, PSU 241 may determine a voltage measurement of a common rail of the at least one of IHS 110 and chassis 200. In one or more embodiments, determining a voltage measurement of a common rail may include receiving, from an analog to digital converter, digital data that indicates the voltage measurement of the common rail. For example, PSC 430 may include analog to digital converter circuitry that may provide digital data that indicates the voltage measurement of the common rail.

At 520, it may be determined if the voltage measurement of the common rail is zero volts. For example, PSU 241 may determine if the voltage measurement of the common rail is zero volts. If the voltage measurement of the common rail is zero volts, power at a first voltage may be provided, at 525. In one or more embodiments, PSU 241 may provide power at the first voltage to the at least one of IHS 110 and chassis 200. For example, PSU 241 may provide power at the first voltage to the at least one of IHS 110 and chassis 200 via the common rail. For instance, the first voltage may be a voltage 610, illustrated in FIG. 6. In one or more embodiments, voltage 610 may be twelve volts (12V).

At 530, information from the at least one of the information handling system and the chassis may be received. For example, PSU 241 may receive information from the at least one of IHS 110 and chassis 200. For instance, PSU 241 may receive information from the at least one of IHS 110 and chassis 200 via a bus, described herein, among others. In one or more embodiments, the information from the at least one of the information handling system and the chassis may include configuration information. In one example, the configuration information may indicate that the at least one of the information handling system and the chassis operates utilizing the first voltage. In another example, the configuration information may indicate that the at least one of the information handling system and the chassis operates utilizing a second voltage, greater than the first voltage. For instance, the second voltage may be associated with operating one or more graphics processing units.

Figure 6:
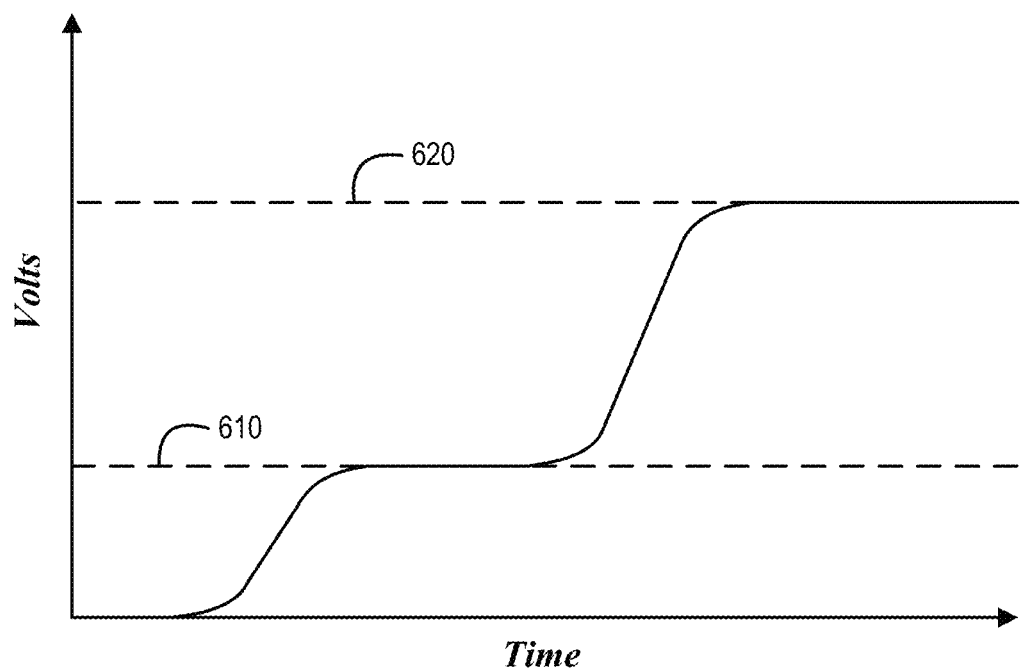
FIG. 6 illustrates a graph of volts versus time of a first voltage and a second voltage, according to one or more embodiments.

At 535, it may be determined if the power supply unit is appropriately matched. For example, PSU 241 may determine if PSU 241 is appropriately matched with the at least one of IHS 110 and chassis 200. In one or more embodiments, determining if the power supply unit is appropriately matched may be based at least on the information from the at least one of the information handling system and the chassis. If the power supply unit is appropriately matched, power may be provided at the second voltage, at 540. In one or more embodiments, PSU 241 may provide power at the second voltage to the at least one of IHS 110 and chassis 200. For example, PSU 241 may provide power at the second voltage to the at least one of IHS 110 and chassis 200 via the common rail. For instance, the second voltage may be a voltage 620, illustrated in FIG. 6. In one or more embodiments, if PSU 241 determines that PSU 241 is appropriately matched with the at least one of IHS 110 and chassis 200, PSU 241 may step its output voltage from voltage 610 to voltage 620, as shown in FIG. 6. For example, voltage 620 may be forty-eight volts (48V).

If the power supply unit is not appropriately matched, information indicating that the power supply is not appropriately matched may be provided, at 545. For example, PSU 241 may provide information indicating that the power supply is not appropriately matched to the at least one of IHS 110 and chassis 200. In one instance, PSU 241 may provide information indicating that PSU 241 is not appropriately matched to BMC 185. In another instance, PSU 241 may provide information indicating that PSU 241 is not appropriately matched to EC 210. In one or more embodiments, PSU 241 providing information indicating that the power supply is not appropriately matched to the at least one of IHS 110 and chassis 200 may include providing the information indicating that PSU 241 is not appropriately matched via a bus. For example, the bus may be or include a bus described herein, among others. At 550, the power supply unit may shut down. In one or more embodiments, while PSU 241 may initially provide power at the first voltage to the at least one of IHS 110 and chassis 200 that utilizes power at the first voltage, PSU 241 may not be configured to continually and/or sustainably provide power at the first voltage to the at least one of IHS 110 and chassis 200 that utilizes power at the first voltage. For example, PSC 430 may instruct PCD 411 to shut down, after determining that the at least one of IHS 110 and chassis 200 utilizes power at the first voltage, as PCD 411 may not be configured to continually and/or sustainably provide power at the first voltage to the load that utilizes power at the first voltage. For instance, PCD 411 may be configured to optimally provide power at the second voltage.

If the voltage measurement of the common rail is not zero volts, it may be determined if the voltage measurement of the common rail is greater than or equal to a rated output voltage range of the power supply unit, at 555. If the voltage measurement of the common rail is greater than or equal to the rated output voltage range of the power supply unit, the power supply unit may provide power at the second voltage, at 560. For example, PSU 241 may provide power to the at least one of IHS 110 and chassis 200 at the second voltage.

If the voltage measurement of the common rail is not greater than or equal to the rated output voltage range of the power supply unit, the power supply unit may provide information to the at least one of the information handling system and the chassis, at 565. For example, PSU 241 may provide information to the at least one of IHS 110 and chassis 200. For instance, the information provided to the at least one of IHS 110 and chassis 200 may indicate that PSU 241 is not appropriately matched to the at least one of IHS 110 and chassis 200. In one or more embodiments, PSU 241 may provide the information to BMC 185. In one or more embodiments, PSU 241 may provide the information to EC 210. In one or more embodiments, PSU 241 providing information indicating that PSU 241 is not appropriately matched to the at least one of IHS 110 and chassis 200 may include providing the information indicating that PSU 241 is not appropriately matched via a bus. For example, the bus may be or include a bus described herein, among others.

At 570, the power supply may provide no power to the at least one of the information handling system and the chassis. For example, PSU 241 may provide no power to the at least one of IHS 110 and chassis 200. In one or more embodiments, the power supply unit may not have been providing power to the at least one of the information handling system and the chassis. For example, the power supply unit may continue to not provide power to the at least one of the information handling system and the chassis.

Figure 7:
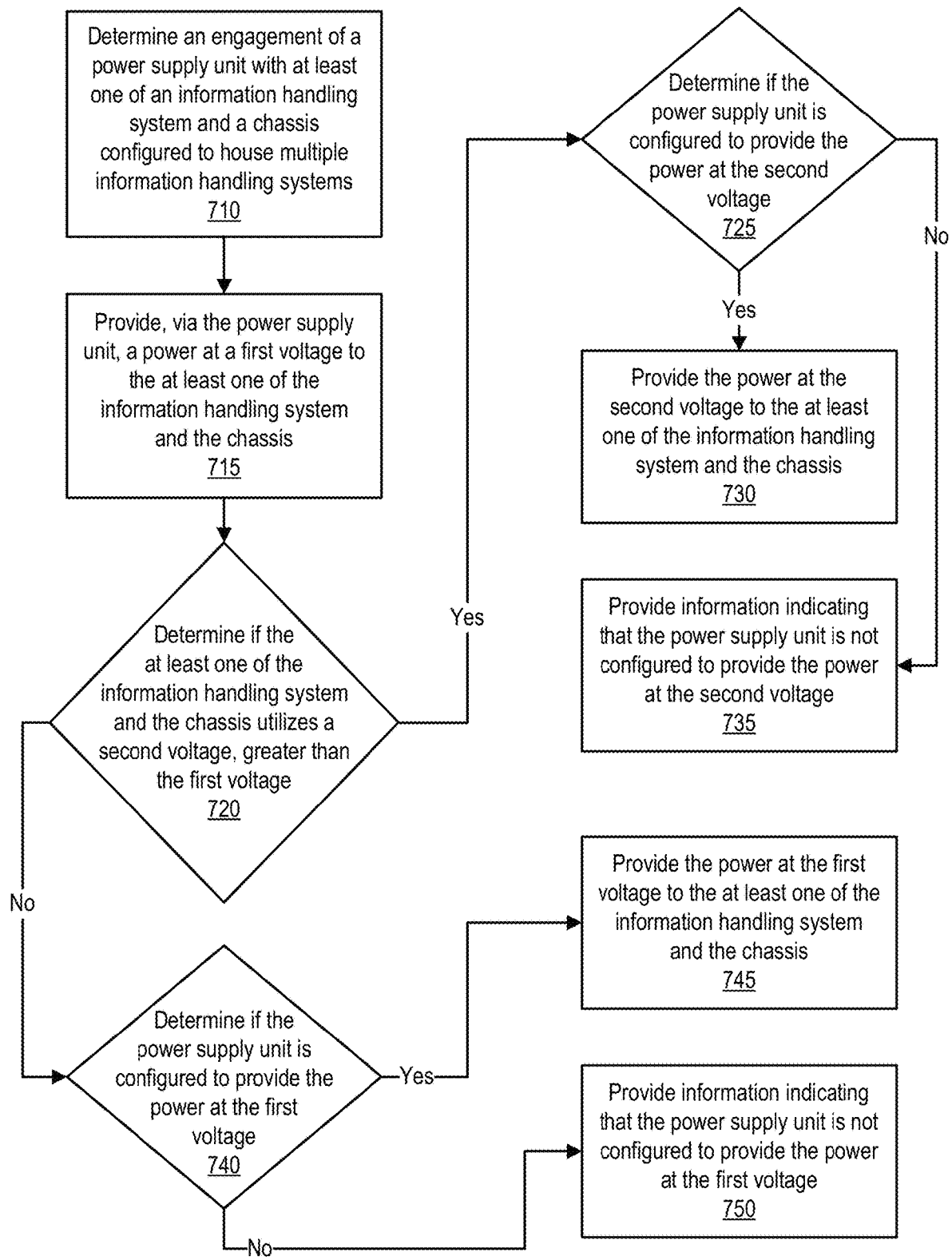
FIG. 7 illustrates an example of another method of utilizing a power supply unit, according to one or more embodiments.

Turning now to FIG. 7, an example of another method of utilizing a power supply unit is illustrated, according to one or more embodiments. At 710, an engagement of a power supply unit with at least one of an information handling system and a chassis, configured to house multiple information handling systems, may be determined. In one example, an engagement of PSU 240 with at least one of IHS 110 and chassis 200 may be determined. In one instance, PSU 240 may determine the engagement of PSU 240 with the at least one of IHS 110 and chassis 200. In another instance, the at least one of IHS 110 and chassis 200 may determine the engagement of PSU 240 with the at least one of IHS 110 and chassis 200. In another example, an engagement of PSU 241 with at least one of IHS 110 and chassis 200 may be determined. In one instance, PSU 241 may determine the engagement of PSU 241 with the at least one of IHS 110 and chassis 200. In another instance, the at least one of IHS 110 and chassis 200 may determine the engagement of PSU 241 with the at least one of IHS 110 and chassis 200.

At 715, a power at a first voltage may be provided, via the power supply unit, to the at least one of the information handling system and the chassis. In one example, PSU 240 may provide a power at a first voltage to the at least one of the information handling system and the chassis. In another example, PSU 241 may provide a power at a first voltage to the at least one of the information handling system and the chassis. At 720, it may be determined if the at least one of the information handling system and the chassis utilizes a second voltage, greater than the first voltage. In one example, PSU 240 may determine if the at least one of IHS 110 and chassis 200 utilizes a second voltage, greater than the first voltage. In a second example, PSU 241 may determine if the at least one of IHS 110 and chassis 200 utilizes a second voltage, greater than the first voltage. In another example, the at least one of IHS 110 and chassis 200 may determine if the at least one of IHS 110 and chassis 200 utilizes a second voltage, greater than the first voltage.

In one or more embodiments, determining if the at least one of the information handling system and the chassis utilizes the second voltage may include receiving information, from the at least one of the information handling system and the chassis, that indicates if the at least one of the information handling system and the chassis utilizes the second voltage. In one example, PSU 240 may receive the information that that indicates if the at least one of IHS 110 and chassis 200 via at least one of bus and a connector, among others. In another example, PSU 241 may receive the information that that indicates if the at least one of IHS 110 and chassis 200 via at least one of bus and a connector, among others. In one or more embodiments, determining if the at least one of the information handling system and the chassis utilizes the second voltage may include determining a voltage measurement across a resistor. For example, determining if the at least one of the information handling system and the chassis utilizes the second voltage may include determining if the voltage measurement matches a third voltage. For instance, determining if the voltage measurement matches the third voltage may include determining if the voltage measurement is below a first threshold voltage associated with the third voltage and/or a above a second threshold voltage associated with the third voltage. In one or more embodiments, determining the voltage measurement across the resistor may include receiving, from an analog to digital converter, digital data that indicates the voltage measurement across the resistor.

If the at least one of the information handling system and the chassis utilizes the second voltage, it may be determined if the power supply unit is configured to provide the power at the second voltage, at 725. In one example, PSU 240 may determine if the at least one of the information handling system and the chassis utilizes the second voltage. In a second example, PSU 241 may determine if the at least one of the information handling system and the chassis utilizes the second voltage. In another example, the at least one of IHS 110 and chassis 200 may determine if the at least one of IHS 110 and chassis 200 utilizes the second voltage. If the power supply unit is configured to provide the power at the second voltage, the power at the second voltage may be provided to the at least one of the information handling system and the chassis, at 730. For example, PSU 241 may provide the power at the second voltage the at least one of IHS 110 and chassis 200.

If the power supply unit is not configured to provide the power at the second voltage, information indicating that the power supply unit is not configured to provide the power at the second voltage may be provided, at 735. In one example, PSU 240 may provide information indicating that PSU 240 is not configured to provide the power at the second voltage. In one instance, PSU 240 providing information indicating that PSU 240 is not configured to provide the power at the second voltage may include proving light emissions that indicate that PSU 240 is not configured to provide the power at the second voltage. In another instance, PSU 240 providing information indicating that PSU 240 is not configured to provide the power at the second voltage may include proving data to the at least one of IHS 110 and chassis 200 that indicates that the PSU 240 is not configured to provide the power at the second voltage.

If the at least one of the information handling system and the chassis does not utilize the second voltage, it may be determined if the power supply unit is configured to provide the power at the first voltage, at 740. In one example, PSU 240 may determine if PSU 240 is configured to provide the power at the first voltage. In a second example, PSU 241 may determine if PSU 241 is configured to provide the power at the first voltage. In a third example, the at least one of IHS 110 and chassis 200 may determine if PSU 240 is configured to provide the power at the first voltage. In another example, the at least one of IHS 110 and chassis 200 may determine if PSU 241 is configured to provide the power at the first voltage. If the power supply unit is configure to provide the power at the first voltage, the power at the first voltage may be provided to the at least one of the information handling system and the chassis, at 745. For example, PSU 240 may provide power to the at least one of IHS 110 and chassis 200.

If the power supply unit is not configured to provide the power at the first voltage, information indicating that the power supply unit is not configured to provide the power at the first voltage may be provided, at 750. In one example, PSU 241 may provide information indicating that PSU 241 is not configured to provide the power at the first voltage. In one instance, PSU 241 providing information indicating that PSU 241 is not configured to provide the power at the first voltage may include proving light emissions that indicate that PSU 241 is not configured to provide the power at the first voltage. In another instance, PSU 241 providing information indicating that PSU 241 is not configured to provide the power at the first voltage may include proving data to the at least one of IHS 110 and chassis 200 that indicates that the PSU 241 is not configured to provide the power at the first voltage. In one or more embodiments, while PSU 241 may initially provide power at the first voltage to the at least one of IHS 110 and chassis 200 that utilizes power at the first voltage, PSU 241 may not be configured to continually and/or sustainably provide power at the first voltage to the at least one of IHS 110 and chassis 200 that utilizes power at the first voltage. For example, PSC 430 may instruct PCD 411 to shut down, after determining that the at least one of IHS 110 and chassis 200 utilizes power at the first voltage, as PCD 411 may not be configured to continually and/or sustainably provide power at the first voltage to the load that utilizes power at the first voltage. For instance, PCD 411 may be configured to optimally provide power at the second voltage.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A chassis, comprising:
an information handling system (IHS) comprising a plurality of components; and
a first power supply unit (PSU) comprising:
at least one processor;
a power controller device;
a power supply controller coupled to a current source; and
a memory medium, coupled to the at least one processor, that stores instructions executable by the at least one processor, which when executed by the at least one processor, cause the first PSU to:
provide power at a first voltage to the IHS;
determine if the IHS utilizes power at a second voltage greater than the first voltage, wherein the determining comprises the power supply controller (PSC) communicating with the current source to provide a first current to a resistor in the IHS and measuring the voltage across the resistor;
if the IHS utilizes power at the second voltage:
determine if the first PSU is configurable to provide the power at the second voltage; wherein
if the first PSU is configurable to provide power at the second voltage, communicate with the power controller device to provide power at the second voltage to the IHS, wherein the second voltage is associated with providing power to one or more graphics processing units (GPU)s; and
if the first PSU is not configurable to provide power at the second voltage, provide information indicating that the first PSU is not configurable to provide power at the second voltage; and
if the IHS does not utilize power at the second voltage:
determine if the first PSU is configured to provide power at the first voltage;
if the first PSU is configured to provide power at the first voltage, provide power at the first voltage to the IHS; and
if the first PSU is not configured to provide power at the first voltage, provide information indicating that the first PSU is not configured to provide power at the first voltage.

2. The chassis of claim 1, wherein:
the IHS comprises a second PSU in the same form factor as the first PSU; and
the first PSU and the second PSU share a common electrical coupling.

3. The chassis of claim 1, wherein, to determine if the IHS utilizes power at the second voltage, the instructions further cause the first PSU to receive information from the IHS that indicates if the IHS utilizes power at the second voltage.

4. The chassis of claim 3, wherein, to receive the information from the IHS, the instructions further cause the first PSU to receive the information via at least one of a bus and a connector.

5. A method for providing power to a chassis containing an information handling system (IHS) having a plurality of components, each component operable at one of a plurality of voltages, the method comprising:
determining an engagement of a first power supply unit (PSU) with an information handling system (IHS), wherein the first PSU comprises a power controller device;
providing, via the first PSU, power at a first voltage to the IHS;
determining, by the first PSU, that the IHS utilizes power at a second voltage greater than the first voltage based on configuration information received by the first PSU from the IHS, wherein the determining comprises a power supply controller (PSC) in the first PSU communicating with a current source to provide a first current to a resistor in the IHS and measuring the voltage across the resistor;
in response to determining that the IHS utilizes power at the second voltage:
determining that the first PSU is configurable to provide power at the second voltage;
based on determining that the first PSU is configurable to provide power at the second voltage, communicating with the power controller device to provide power at the second voltage to the IHS, wherein the second voltage is associated with providing power to one or more graphics processing units (GPU)s.

6. The method of claim 5, wherein:
the IHS comprises a second PSU in the same form factor as the first PSU; and
the first PSU and the second PSU share a common electrical coupling.

7. The method of claim 5, wherein the receiving the information from the information handling system includes receiving the information via at least one of a bus and a connector.

* * * * *